TAPE RECORDING MECHANISM WITH ENDLESS MAGNETIC TAPE STORED IN A FIGURE 8

Original Filed June 18, 1963 3 Sheets-Sheet 1

INVENTORS:
JAMES T. BLAKISTONE,
IRVING KARSH
BY
Richard E. Bee
ATTORNEY

INVENTORS:
JAMES T. BLAKISTONE,
IRVING KARSH
BY
Richard E. Bee
ATTORNEY

INVENTORS:
JAMES T. BLAKISTONE,
IRVIN KARSH
BY
Richard E. Bee
ATTORNEY

United States Patent Office 3,401,397

Patented Sept. 10, 1968

3,401,397

TAPE RECORDING MECHANISM WITH ENDLESS MAGNETIC TAPE STORED IN A FIGURE 8

James T. Blakistone, Pasadena, and Irving Karsh, Los Angeles, Calif., assignors to Schlumberger Technology Corporation, Houston, Tex., a corporation of Texas Continuation of application Ser. No. 288,721, June 18, 1963. This application June 13, 1967, Ser. No. 645,839

20 Claims. (Cl. 346—74)

ABSTRACT OF THE DISCLOSURE

One embodiment of the invention reduces the overall width of an endless tape transport mechanism to approximately the same width as the tape, by twisting an internal loop of tape within the magazine through about 180°. This twist enables the tape drive to draw an external loop of tape from the magazine in the plane of rotation of the tape magazine rollers.

This is a continuation of copending U.S. patent application Ser. No. 288,721, filed June 18, 1963, by James T. Blakistone et al., now abandoned.

This invention relates to magnetic tape recording devices and more particularly to such devices adapted to be operated in deep wells.

An object of the invention is to provide effective transport of a magnetic tape past a recording head in ambient temperature ranges varying from normal surface temperatures to those much higher temperatures which are encountered in deep oil wells.

It is frequently desired to make tape recordings of electronic signals derived from sensors within an oil well, as this can give important information concerning the surrounding earth formations, the condition of the casing, and other physical characteristics of the well. For this purpose, it is convenient to lower a tape recording mechanism and amplifier into the oil well to great depths. Often the tape recording device is lowered thousands of feet below the surface of the earth, where temperatures may run as high as 400° F. or greater. It is known that magnetic tapes of the type suitable for recordings change their length with changes of temperature. Mylar tape, for example, undergoes a significant contraction with initial increase in temperature. After the initial contraction of the tape as its temperature increases, the tape will then expand in the normal manner of most other materials, and will contract as the temperature decreases. Since it is desirable to have a long tape in order to put a relatively large amount of information on the tape, there can result a substantial change of length of the tape in the recorder due to this change in temperature. Such changes of tape length pose problems in tape magazines and drives, especially the problem of maintaining a nearly constant tape tension within the magazine and of guiding the tape. It is axiomatic that uniformity of tape conditions at the recording head be maintained.

In accordance with the present invention, I provide an assembly and mechanism whereby a relatively long length of tape may be accommodated in a relatively small space, while still permitting the tape to undergo changes in temperature over a wide range without upsetting the effective operation of the tape at the recording head. I carry out my invention by provision of means for winding and unwinding magnetic tape from a single roller in combination with another roller spaced longitudinally within the elongated recorder.

A feature of my invention resides in means for providing additional tape within the recorder to prevent binding when the tape contracts as the recorder goes deeper into the well.

Another features resides in a magnetic recording head, a series of tape driving wheels, a slack tape storage bin, a pair of twist guides to support the tape at elevated temperatures, and a tape magazine, all integrally attached and mounted within an elongated tubular housing of such limited cross-section that it may be inserted into a protective tubular cover and lowered inside an oil well.

The foregoing and other features of my invention will be better understood from the following detailed description and the accompanying drawings in which.

Figure 2:
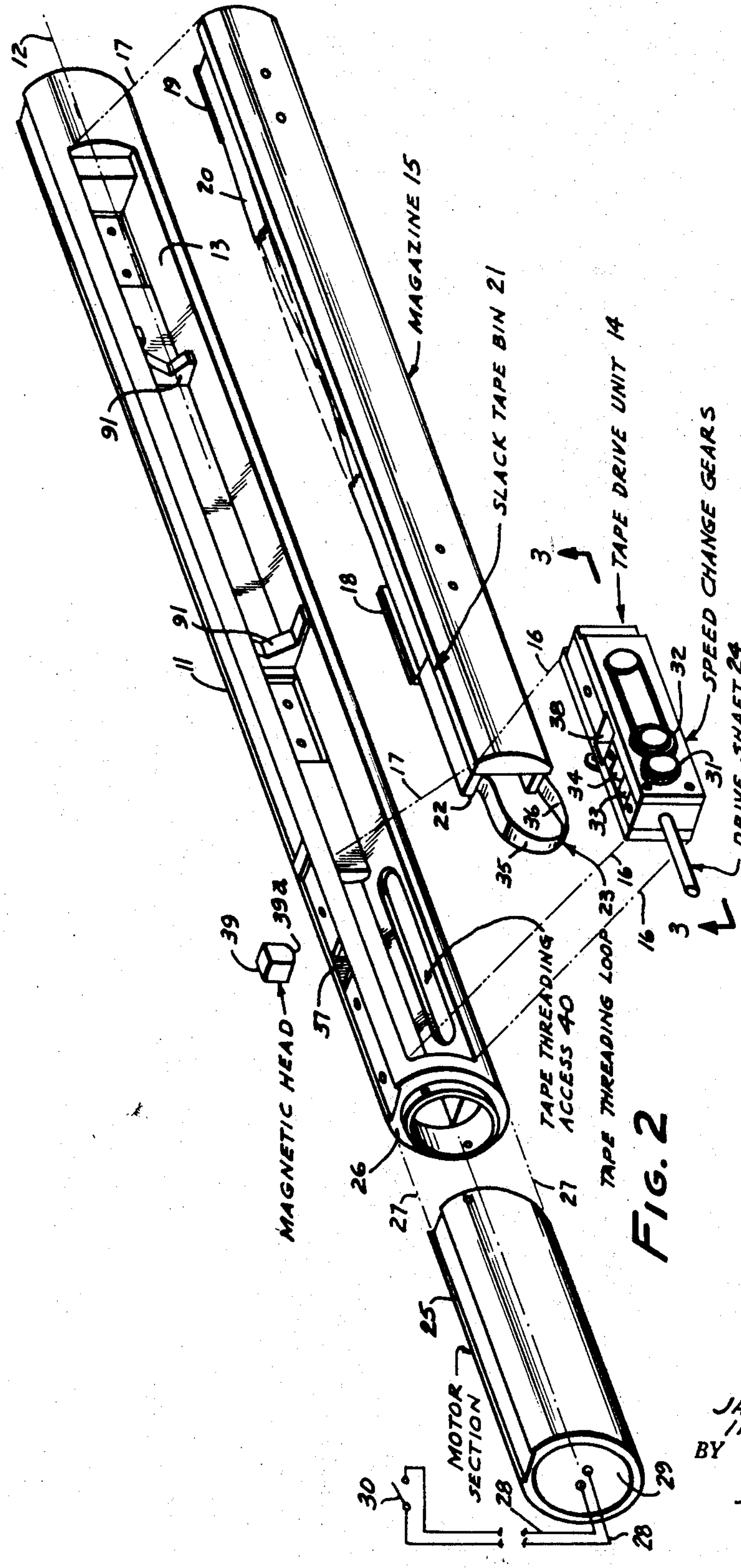
FIG. 2 is an isometric exploded view showing parts of the mechanism of FIG. 1.
Figure 1:
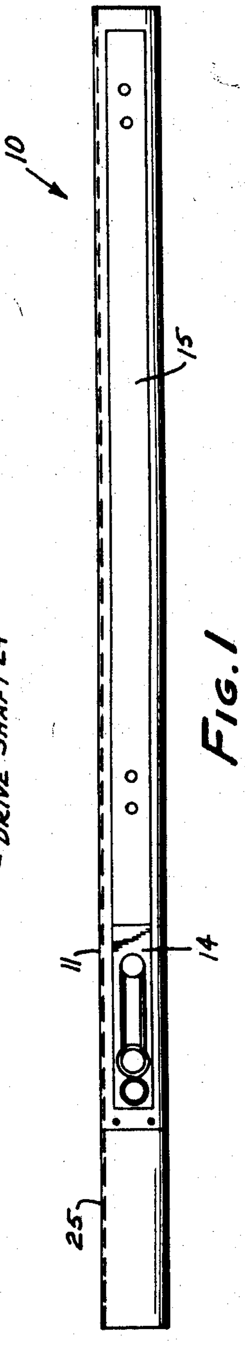
FIG. 1 is a side view of a tape recording mechanism in accordance with this invention, adapted to be lowered within an oil well.

Referring to FIGS. 1 and 2 of the drawings, there is shown a tape recorder 10 having a housing 11 of generally tubular shape. Since the housing is intended to be lowered inside an oil well, or other bore hole drilled into the earth, the length of the housing along a longitudinal axis 12 will be greater than the diameter of the housing. For example, the length of the housing may be on the order of about five or six feet, while the diameter may be on the order of about two inches. Housing 11 encloses an internal cavity 13 with an opening extending along a side of the housing parallel to the longitudinal axis, and adapted to accommodate a tape drive unit 14 and a tape magazine 15. The tape magazine is elongated so that it can accommodate a considerable length of tape disposed on spools of small enough diameter to fit into this housing. Broken lines 16 and 17 (FIG. 2) show the location of the tape drive unit and the magazine within the housing.

Magazine 15 includes a pair of cover plates 18 and 19 which are located near respective ends of the magazine. These side plates are removable to provide access for loading the magazine with magnetic tape 20.

Figures 3, 4:
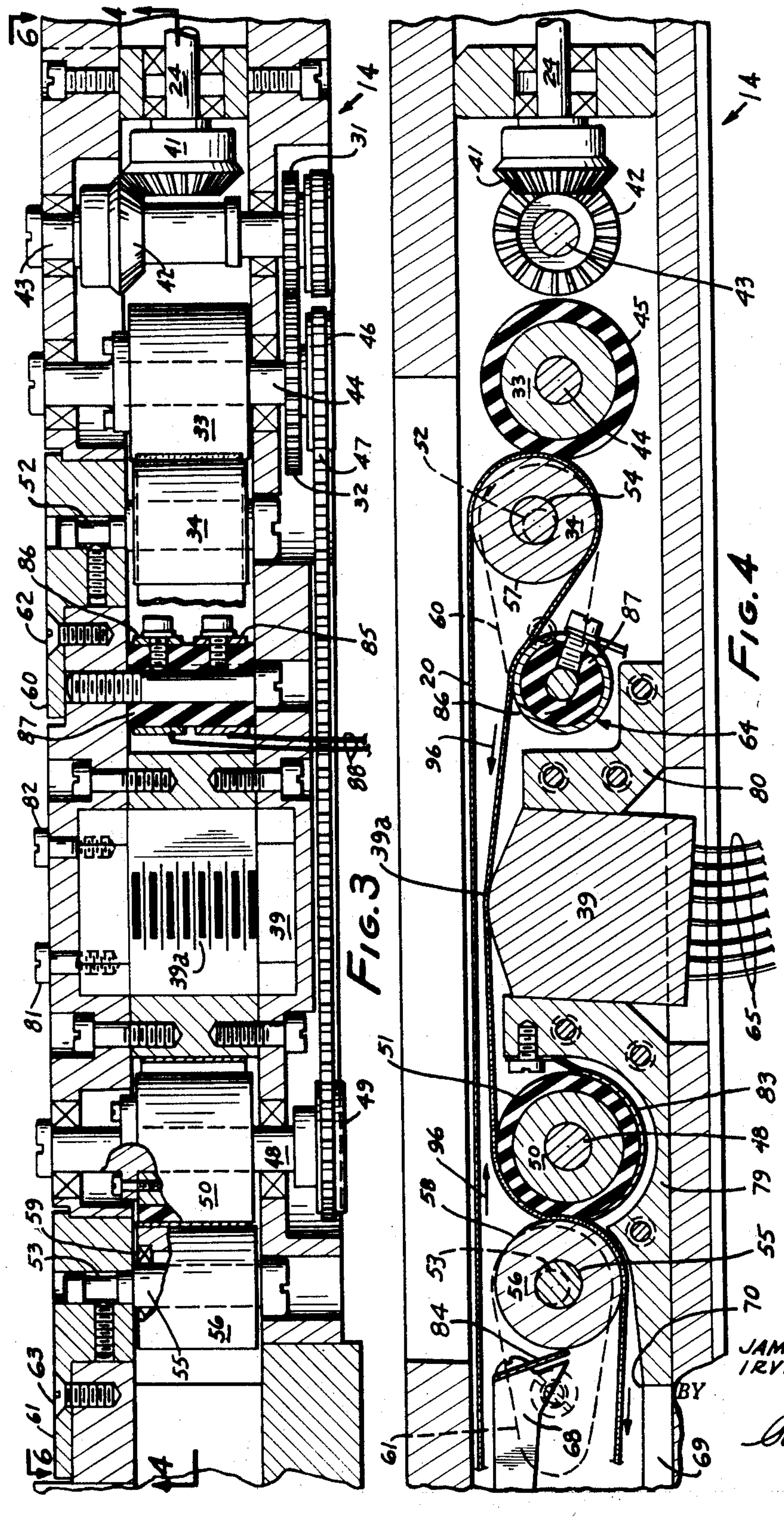
FIG. 3 is a cross-section view taken at line 3—3 of FIG. 2 showing part of the tape drive unit.
FIG. 4 is a cross-section view taken at line 4—4 of FIG. 3.
Figure 5:
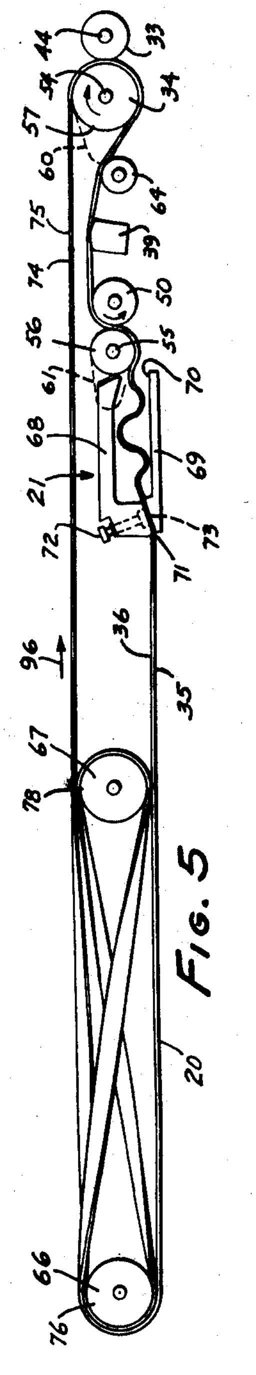
FIG. 5 shows schematically the tape arrangement used in the mechanism of FIGS. 1 and 2.

FIG. 2 shows a storage bin 21, for storing slack tape, as shown in FIG. 5, located within the magazine adjacent one end 22. End 22 is open and the storage bin is exposed when cover plate 18 is removed. A threading loop 23 of tape extending beyond the end 22 of the magazine is for the purposes of engaging said tape with the tape drive unit 14 as shown in FIG. 4. The slack tape remaining after this engagement is shoved into storage bin 21. Tape drive unit 14 includes an externally protruding drive shaft 24 which extends parallel to longitudinal axis 12. The drive shaft is driven by a drive means such as a constant speed motor (not shown) housed within a tubular motor section 25 which is attached to an end 26 of recorder housing 11 as shown by dotted lines 27. The motor section also extends longitudinally along axis 12. Two wires 28 inserted into end 29 of motor section 25 electrically connect a switch 30 in series between the motor and a battery or other power suppy for the motor, so that the motor may be turned on and off at the top of the drill well.

Two speed change gears 31 and 32 are attached to a side of a tape drive unit 14, and are mechanically connected to shaft 24 and to a plurality of tape drive wheels. The tape drive wheels include a drive wheel 33 and a pressure wheel 34 within the taped drive unit. The speed change gears may, if desired, be replaced by other sets of gears having a different pitch diameter ratio. This enables the tape speed to be changed without changing the motor speed.

Tape threading loop 23 passes around wheel 34 and between wheels 34 and 33 in the tape drive unit 14. The tape has two sides, a first side 35 being magnetically sensitive, and on the outside of the threading loop, and a second side 36 being on the inside of the loop. A slot 37 extends through a wall of the recorder housing 11 and into the tape drive unit at 38. A magnetic recording head 39 is inserted into the slot 37 and has a recording face **39*a* (shown in FIG. 4) which is brought to bear against the magnetically sensitive side 35 of the magnetic tape. The external loop has a plane of entrance and a plane of egress from the tape magazine which is substantially parallel with the plane of recording face 39*a*. A tape-threading access port 40 also extends from the outer surface to the inner cavity of the housing to allow the threading of magnetic tape in the tape drive unit when the drive unit is mounted within housing 11**.

Tape drive unit 14, as shown in FIGS. 3 and 4, has a bevel drive gear 41 at one end of drive shaft 24. A spur drive gear 31 is mounted to shaft 43 at its end opposite bevel gear 42. A spur driven gear 32, disposed and arranged such that the teeth of gears 31 and 32 are in mesh, is mounted on a shaft 44 which is parallel with shaft 43. Spur gears 31 and 32 together comprise the speed change gears shown in FIG. 1. A tape driving wheel 33, with a circumferential elastic surface 45, shown in FIG. 4, and having a plane of rotation, is mounted on shaft 44. Sprocket wheel 46 is mounted on an end of shaft 44 and accepts a chain 47. Disposed longitudinally away from shaft 24 and within tape drive unit 14 is a driven shaft 48 oriented substantially parallel with shaft 44. A sprocket wheel 49 having the same diameter as sprocket wheel 46 is attached to an end of shaft 48, and is disposed and arranged to have the same plane of rotation as sprocket wheel 46 so that chain 47 may be engaged to said sprocket wheels to drive them in line. Another tape driving wheel 50 has a slightly larger diameter than drive wheel 33 and a circumferential elastic surface 51. Wheel 50 is mounted on shaft 48 and disposed to have the same plane of rotation as drive wheel 33. Because sprocket wheels 46 and 49 are of the same diameter, wheels 33 and 50 will each move with the same angular velocity. Tape driving wheels 33 and 50 constitute a part of a differential capstan drive to maintain constant tape tension over head 39 as will be described later.

Disposed adjacent to each of the drive wheels 33 and 50, on the side opposite shaft 24 are two shafts 52 and 53. The shafts are parallel to shaft 43 and mounted within the tape drive unit. Shafts 52 and 53 each has an eccentrically disposed section 54 and 55, respectively, extending along a portion of the length of each shaft and having a larger diameter than the shaft. Two pressure wheels 34 and 56 are mounted onto shaft sections 54 and 55, respectively, and are arranged to have a plane of rotation substantially the same as that of drive wheel 33. Each of wheels 34 and 56 has an outer circumferential surface 57 and 58, respectively, and a centrally located hole with a bearing 59 disposed around respective holes as shown in FIG. 3 on roller 56.

Figure 6:
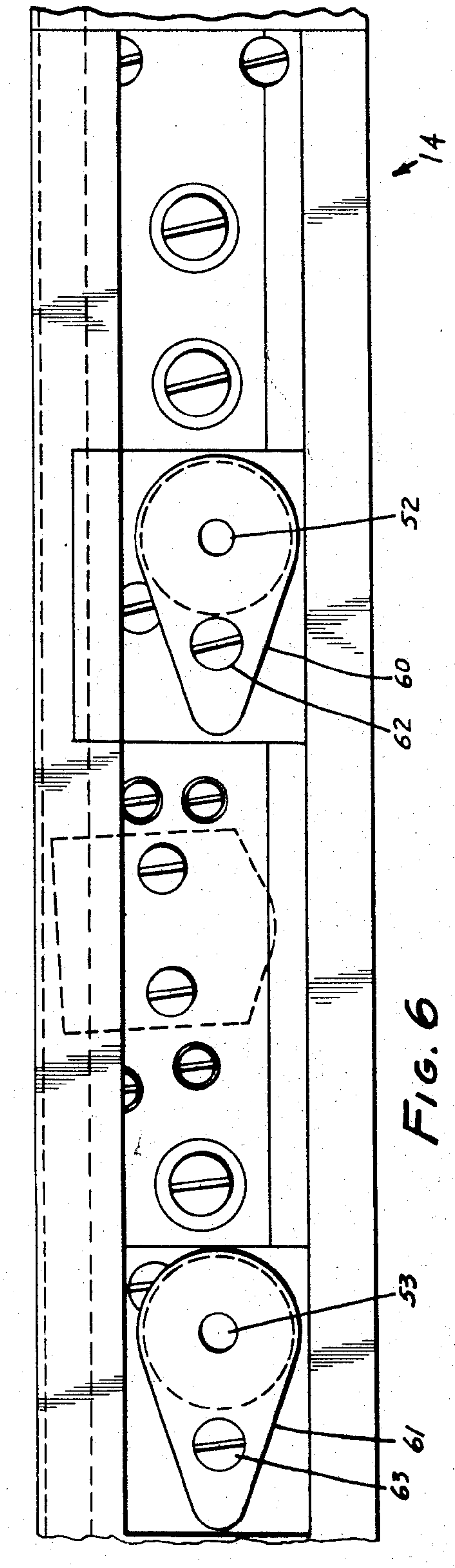
FIG. 6 is a side view showing details of the mechanism, looking from line 6—6 of FIG. 3.

Levers 60 and 61 shown in FIG. 6, each being elongated along a longitudinal axis, are attached to the ends of shafts 52 and 53, respectively. Shafts 52 and 53 with their pressure wheels attached are inserted into the tape drive unit with their levers substantially normal to longitudinal axis 12. Eccentric sections 54 and 55 and levers 60 and 61 are disposed and arranged on their respective shafts such that when the longitudinal axes of the levers 60 and 61 are parallel to longitudinal axis 12 of the tape recorder, the circumferential surfaces 57 and 58 of pressure wheels 34 and 56 respectively, bear against the magnetic tape 20. The magnetic tape in turn bears against the circumferential elastic compressive surfaces 45 and 51 of drive wheels 33 and 50, respectively, resulting in a frictional drive of the magnetic tape when the drive wheels are rotated. When in operation in a drill well, the recorder is normally housed in a protective tubular cover which is not shown in the drawings. Due to the configuration of the tubular cover and the elongated handles, it is impossible to insert the recorder 10 within the tubular cover until the lever is rotated to the position shown in FIG. 6. This is a feature designed to insure the proper operating position of the pressure wheel which is vital to operation of the invention. Two screws 62 and 63 hold levers 60 and 61, respectively, to the tape drive unit after the levers are in their proper positions.

An end of tape sensor 64 is mounted between recording head 39 and pressure wheel 34, and is disposed in such a manner as to guide the tape from pressure wheel 34 to the recording head. The multichannel magnetic recording head 39 is attached to the tape drive unit located between drive wheel 50 and pressure wheel 34, as shown in FIG. 4. For one application of the invention, an eight channel recording head is attached by wires 65 to suitable electrical signaling circuits. Appropriate sensors are used to provide a signal, such as a digital signal, proportional to a phenomenon being measured. Examples of phenomenon to be investigated are temperature, pressure, and other physical conditions within the well, as well as various characteristics of the earth formations adjacent the well. Such an arrangement enables a plurality of conditions to be measured and recorded concurrently.

The tape magazine 15 houses two tape rollers 66 and 67 shown in the schematic arrangement in FIG. 5. Each roller has the same plane of rotation as drive wheel 33 of the tape drive unit. One of the rollers, namely the take-up and release roller 66, is located adjacent the end of the magazine farthest from shaft 24. The other roller, namely the magazine tension roller 67, is axially spaced from the take-up and release roller. The slack tape storage bin 21 is located in the magazine between the magazine tension roller and pressure wheels 56 of the tape drive unit. The storage bin comprises two members 68 and 69 which, when attached together in the magazine, will form a cavity with an inlet opening 70 facing towards pressure wheel 56 and a smaller outlet passageway 71, facing toward the magazine tension roller 67. Mounted within member 68 and located adjacent said outlet passageway 71 is a spring-loaded drag brake 72 with a pressure pad 73 extending into the passageway and bearing against the second side 36 of the magnetic tape.

The magnetic tape 20 which is loaded into the tape recorder has two ends, one being a leading end 74 and the other being a trailing end 75. Before joining the two ends together, the leading end 74 is inserted into the tape magazine over the rollers 66 and 67 as shown in FIG. 5. The magnetically sensitive side of the tape faces away from rollers 66 and 67, and the tape pulled through into the tape drive unit.

The trailing end 75 is looped one-half turn around the periphery of take-up and release roller 66 starting at point 76 on the roller, with the second side of the tape bearing against said roller. The trailing end 75 is then given a 180° twist and looped one-half turn around the magazine tension roller 67 starting at point 78 on the roller with the second side 36 of the tape bearing against the magazine tension roller. The trailing end 75 of the tape is given another 180° twist and fed one-half turn around the take-up and release roller 66 starting at point 76 with the second side of the magnetic tape facing towards the roller 66.

The magnetic tape may be continued to feed around rollers 66 and 67 according to the manner previously described for a number of times, until a desired amount of tape has been loaded into the magazine. It is to be understood that the tape may be twisted between rollers 66 and 67 in either a clockwise or a counterclockwise manner, the requisite being that the twists be consistent after the initial loop on rollers 66 and 67 have been made, and each succeeding turn overlies the preceding turn. While the drawings show the tape twisted 180°, the tape may also be twisted other than 180° between rollers 66 and 67, such as a 90° twist. For a 90° twist, magazine tension roller 67 would have a plane of rotation substantially perpendicular to the plane of rotation of take-up and release roller 66.

After the magazine is loaded as previously described, the trailing end of the tape is inserted into the passageway 71 of the slack tape storage bin 21. The spring-loaded drag brake 72 is adjusted so that pressure pad 73 will produce the desired pressure aganist the second side of the magnetic tape. The tape tension in the magazine is determined by the dynamic frictional forces acting on the tape from pressure pad 73 of the spring-loaded drag brake as the tape passes through outlet passageway 71. The trailing end 75 is then passed through the opening at 70 of the slack tape storage bin and cemented to the leading end 74 such that the sides of the tape are consistent at the bond, thereby forming the tape threading loop 23. Loop 23 is then threaded between wheels 34 and 33, the lower edge of the loop passing over the end of tape sensor 64 and between wheels 56 and 50, such that the magnetically sensitive side 35 of the tape will bear against the recording head 39 in the conventional manner. The remaining slack tape is then pulled back through the tape drive unit to the desired tape tension, the pressure wheels 34 and 56 rotated into their operational positions and the slack tape inserted into the slack tape storage bin.

Recording head 39 is aligned within the tape drive unit by two restraining members 79 and 80 as shown in FIG. 4, and is rigidly attached to the drive unit 14 by two screws 81 and 82 shown in FIG. 3. A slight clearance is provided between the recording head 39 and members 79 and 80 so that the head may be easily inserted and removed from the tape drive unit. Member 79 has a configuration whereby it extends from the magnetic recording head to the opening 70 of the slack tape storage bin and controls the movement of magnetic tape as it passes from between the wheels 50 and 56 to the opening of the storage bin. A doctor blade 83 is attached to restraining member 79 and bears against a segment of the circumferential surface 51 of wheel 50. Another doctor blade 84 is attached to the slack tape storage bin member 68 and bears against the circumferential surface 58 of pressure wheel 56. The doctor blades 83 and 84 help to eliminate any possibility of tape jams by effectively peeling the tape away from wheels 50 and 56, respectively, should the tape attempt to continue in an undesirable movement around the wheels.

In addition to serving as a tape guide, end of tape sensor 64 will also either serve to indicate, or stop the operation of the recorder, when substantially all of the tape in the recorder has passed over the recording head. After loading the tape in the recorder, a contactor such as an electrically conductive band (not shown) is attached across the width of the tape at a short distance downstream in the direction of tape travel from the recording head. Sensor 64 comprises two electrically conductive rings 85 and 86, spaced and insulated from each other and insulated from the housing, extending around the periphery of a cylinder 87. Rings 85 and 86 bear against the tape and act as two contacts of a switch. The rings are attached by two wires 88 to a circuit (not shown) such that when there is electrical contact across the rings, a signal may be presented to an indicating device to display the fact that substantially all of the tape in the recorder has passed over the recording head. It is preferred, but optional, that rings 85 and 86 be connected to an external device which will automatically stop the motor in motor section 25. The recorder will then operate continuously, or in a manner controlled by switch 30, until the conductive band passes over end of tape sensor 64, thereby closing the switch and causing the recorder to stop.

When the operating temperature within the recorder increases, the tensile strength of the tape decreases and the tape loop in the magazine tends to sag. A guide means such as a twist guide is used to support the tape loop within the magazine when the operating temperature of the recorder is increased.

Figure 7:
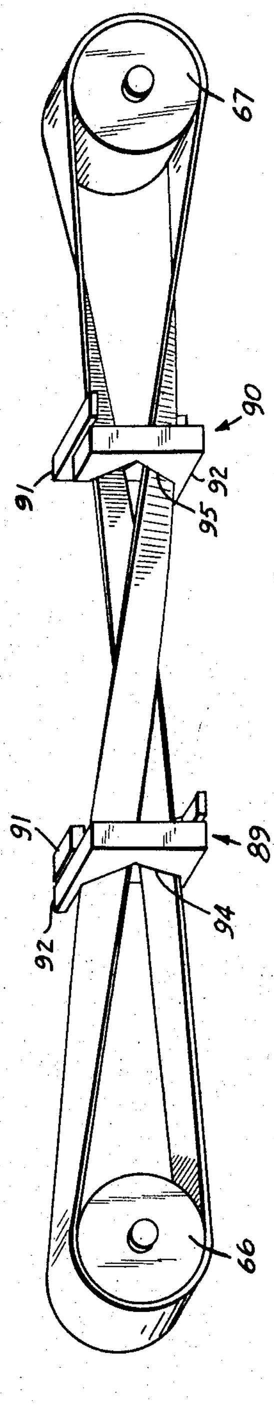
FIG. 7 is an isometric view showing part of the tape included in the assembly of FIGS. 1 and 2.

FIG. 7 shows the magnetic tape loop within the magazine with a pair of twist guides 89 and 90 embracing the loop. Twist guides 89 and 90 are placed approximately one-third the longitudinal distance between rollers 66 and 67 and from each other. Each twist guide comprises two members 91 and 92. Member 91 of each twist guide is attached to a wall of the internal cavity 13 of housing 11 shown in FIG. 1, and member 92 is attached within the magazine to be aligned with member 91, as shown in FIG. 7, when the magazine is inserted within housing 11. The members of the twist guides 89 and 90 form a centrally located opening 94 and 95 respectively, of a configuration to match the angular relationship of the twisted tape wherein opposite sides of the tape loop bear against two diametrically opposite sides of the opening. The twist guides shown in the drawings comprising two members separated from each other, merely illustrate a method of supporting and guiding the magnetic tape loop, and it should be understood that other twist guides of different configurations may be used to produce the same desired results.

The operation should be apparent from the above description. The recorder in its portective tubular cover and associated signaling circuits and sensors are lowered into the oil well by means such as a cable to a desired depth where information sought is to be recorded. Switch 30 is turned on and the recorder starts its operation recording the signals emanating from the sensors. The recorder may also be operated while it is in the process of being lowered or raised within the well. The tape will move in a direction as shown by arrows 96 in FIGS. 4 and 5, when the recorder is in operation. Tape tension over the magnetic recording head 39 in tape drive unit 14 will be maintained by the differential capstan drive. Because of the very slight difference in the diameters of tape drive wheels 33 and 50, and the same angular velocities of the wheels, wheel 50 tends to pull the tape across the magnetic head at a faster rate than wheel 33 draws it from the magazine. This causes the tape, which passes from wheel 33 to wheel 50, to be elongated and, because of the relative linear velocities on the periphery of the tape drive wheels, results in a constant tape tension while passing over the head.

It should be realized that the above description and accompanying drawings are presented as merely a method of obtaining the desired tape tension across the recording head. Other methods of obtaining the desired tension may be used, such as by making wheels 33 and 50 of the same size diameter and the angular velocity of wheel 50 slightly faster than that of wheel 33. This may be done by making sprocket wheel 49 slightly smaller than sprocket wheel 46 and will result in substantially the same desired tape tension across the recording head as previously described.

As the operating temperature increases within the tape recorder, the tape will initially contract tending to increase the tension of the tape within the magazine. After the initial contraction, the tape will expand in the elevated temperature and upon cooling will contract in the normal manner as other materials. The initial increase in tension would normally result in an undesireable elastic elongation of the tape within the magazine, however, the slack tape storage bin, housing slack tape with no tension on it, will pay out slack tape as the tension increases to eliminate any possibility of an elongation of the tape. A uniform differential change in tape tension between the inlet 70 and outlet 71 of the bin will be maintained by the action of the pressure pad on the tape, the slack tape storage bin will release tape into the magazine at a slightly faster rate as the temperature increases to offset this initial increase in tension of the tape and maintain a constant tape tension at any temperature encountered. The converse is also true, in that, when there is an increase in length of the tape due to temperature changes, the magnetic tape will be released into the magazine from the slack tape storage bin at a slower rate and slack tape will be accumulated within the storage bin.

It should be understood that the present invention is not limited by the aforementioned detailed description and drawings, except as in the scope of the appended claims.

1. A tape recording mechanism comprising an endless tape of substantially uniform width defining a centerline therewithin and having at least one internal loop twisted to form at least one figure 8, an external loop with an untwisted portion extending beyond said internal loop, a recording head, drive means for moving said external loop past said recording head, and tension means spaced from said drive means for receiving said internal tape loop, said internal tape loop being wound at least partly around said tension means, said external tape loop overlaying a portion of said wound internal tape loop and in general centerline alignment therewith throughout the entire extending portion of said external loop.

2. Tape recording mechanism comprising a first drive wheel and a second drive wheel spaced from each other and operable to move a tape past a recording head located in the path of travel of the tape from the first drive wheel to the second drive wheel, a means to provide tape tension across said recording head, a take-up and release roller located in the path of travel of the tape after the tape leaves the second drive wheel, a magazine tension roller disposed from the take-up and release roller and in the path of the tape, an endless magnetic tape driven by said drive wheels, said tape having an external loop and an internal loop housed within a magazine, said external loop passing from an end of a magazine and around said first drive wheel, said external loop passing over said recording head and over the take-up and relase roller, said recording head having a recording face disposed on a plane, said external loop having a plane of entrance and a plane of egress from said magazine substantially parallel with said plane of said recording face, said internal loop passing around the take-up and release roller and the magazine tension roller and having a twist of about 180° therebetween to form a crossed loop, a bin in the path of the tape between the second drive wheel and the take-up and release roller, said bin comprising an upstream opening and a downstream outlet, a brake disposed at said downstream outlet operable to produce a drag on the tape thereby maintaining the tape taut as it passes from the bin towards the take-up and release roller, said bin serving to house tape in a slack tension condition.

3. A tape recording mechanism in accordance with claim 2 wherein a restraining member is disposed adjacent said second drive wheel and adjacent said bin and disposed therebetween and having a configuration such as to maintain the direction of movement of tape into said bin, a doctor blade attached to said restraining member operable to peel said tape away from said second drive wheel and prevent the tape from continuing around said drive wheel.

4. A tape recording mechanism in accordance with claim 2 wherein a plurality of loops are passed around the take-up and release roller and the magazine tension roller, said loops being wound individually, each succeeding loop being twisted in such a manner as to overlie each preceding loop.

5. A tape recorder in accordance with claim 2 wherein said second drive wheel causes said tape to move faster than said first drive wheel thereby causing tape tension across said recording head.

6. A tape recorder in accordance with claim 2 comprising an end of tape sensor, said sensor comprising two contacts separated from each other and one disposed and arranged to bear against said tape, said contacts being connected after said endless tape has completely passed over said recording head thereby causing said tape recorder to stop.

7. A tape recorder in accordance with claim 2 wherein a twist guide embraces said internal loop, said twist guide comprising a plurality of members forming a centrally located opening, said opening having an annular configuration having two walls disposed to support said internal loop.

8. A tape recorder in accordance with claim 7 wherein a plurality of twist guides embraces the crossed loop.

9. Tape recording mechanism comprising a first drive wheel and a second drive wheel spaced from each other, a pressure wheel disposed adjacent each of said drive wheels, each of said pressure wheels being eccentrically attached to a rotatable shaft, each of said drive wheels and pressure wheels having a circumferential surface around its periphery, said circumferential surface of each pressure wheel bearing against the circumferential surface of its adjacent drive wheel when said shaft is rotated from a first position to a second position, said pressure wheels and said drive wheels operable to move a tape past a recording head located in the path of the tape from the first drive wheel and its adjacent pressure wheel to the second drive wheel and its adjacent pressure wheel, a take-up and release roller located in the path of travel of the tape after the tape leaves the second drive wheel, a magazine tension roller disposed from the take-up and release roller and in the path of the tape, an endless tape driven by said drive wheels and pressure wheels, said tape having an external loop and an internal loop, said external loop passing over the take-up and release roller and between each drive wheel and its adjacent pressure wheel, thereby passing adjacent the recording head, said internal loop passing around the take-up and release roller and the magazine tension roller, said internal loop being twisted, said internal twisted loop comprising a plurality of tape loops, said tape loops being wound individually wherein each succeeding loop is disposed to overlie each preceding loop, a slack tape bin in the path of the tape between the second drive wheel and the take-up and release roller, said bin comprising an upstream opening and a downstream outlet, a brake disposed at said downstream outlet operable to produce a drag on the tape thereby maintaining the tape taut as it passes from the bin towards the take-up and release roller, said bin serving to house tape in a slack tension condition.

10. A tape recording mechanism in accordance with claim 9 wherein said first and second drive wheels with their respective pressure wheels and the slack tape storage bin, recording head, take-up and release roller and magazine tension roller are contained within a housing, said housing having a circular cross-section and having a length being longer than the diameter of the housing.

11. A tape recorder in accordance with claim 9 wherein each of said drive wheels has a diameter, said diameter of said second drive wheel being larger than said diameter of said first drive wheel to provide tape tension across said recording head.

12. A tape recorder in accordance with claim 9 comprising an end of tape sensor, said sensor comprising two contacts electrically insulated from each other and bearing against said endless tape, said contacts being connected to an external device, said endless tape having an electrically conductive band disposed downstream from said end of tape sensor, said contacts being electrically connected when said band passes said end of tape sensor to signal said external device.

13. Tape recording mechanism disposed within a housing and comprising a first drive wheel and a second drive wheel spaced from each other, two shafts disposed parallel to each other and each being located adjacent a drive wheel, each of said shafts having two ends, a lever being attached at an end of each shaft to rotate the shaft, a pressure wheel being eccentrically located and attached on each shaft, each of said drive wheels and said pressure wheels having a circumferential surface around its periphery and having substantially the same plane of rotation, said housing having a length disposed along a longitudinal axis, said lever having a longitudinal axis, said circumferential surface of each pressure wheel bearing against the circumferential surface of its adjacent drive wheel when said lever is rotated from a first position through a portion of a revolution to a second position about its shaft such that the longitudinal axis of said lever is parallel with said longitudinal axis of said housing, said pressure wheels and said drive wheels disposed and arranged to move a tape past a recording head located in the path of the tape from the first drive wheel and its adjacent pressure wheel to the second drive wheel and its adjacent pressure wheel, a take-up and release roller located in the path of travel of the tape after the tape leaves the second drive wheel, a magazine tension roller disposed from the take-up and release roller and in the path of the tape, an endless tape driven by said drive wheels and pressure wheels, said tape having an external loop and an internal loop, said external loop passing over the take-up and release roller and between each drive wheel and its adjacent pressure wheel, thereby passing adjacent the recording head, said internal loop passing around the take-up and release roller and the magazine tension roller, said internal loop being twisted substantially 180° thereby forming a crossed loop, said internal crossed loop comprising a plurality of tape loops, said tape loops being wound individually wherein each succeeding loop is twisted and disposed to lie over each preceding loop, a plurality of twist guides embracing said internal crossed loop, each of said twist guides comprising a plurality of members forming a centrally located opening with tape passing therethrough, said opening having an annular configuration to support the crossed loop, a bin in the path of the tape between the second drive wheel and the take-up and release roller, said bin comprising an upstream opening and a downstream outlet, a brake disposed at said downstream outlet operable to produce a drag on the tape thereby maintaining the tape taut as it passes from the bin toward the take-up and release roller, said bin serving to house tape in a slack tension condition, said housing having a circular cross-section and having a length longer than the diameter of the housing.

14. A tape recorder in accordance with claim 13 wherein each of said drive wheels has a diameter, the diameter of said second drive wheel being larger than the diameter of said first drive wheel to provide a tape tension across said recording head.

15. A tape recorder in accordance with claim 13 wherein said housing is restricted from being lowered into a protective enclosure when the levers are in said first position, said housing capable of being lowered into said protective enclosure when said levers are rotated approximately 90° to said second position.

16. A combination in accordance with claim 15 wherein said first drive wheel and said second drive wheel rotate with the same angular velocity, said second drive wheel being larger than said first drive wheel to provide tape tension across said recording head.

17. A combination in accordance with claim 15 wherein said recorder and magazine are disposed within a housing, said housing having a circular cross-section and having a length being longer than the diameter of the housing, said length being disposed along a longitudinal axis, said lever on the shaft of each pressure wheel having a longitudinal axis, said levers being rotated approximately 90° to a position wherein the longitudinal axis of each lever is substantially parallel with the longitudinal axis of said housing such that the circumferential surface of each pressure wheel bears against the circumferential surface of its respective drive wheel.

18. In combination: a tape recorder and a tape magazine, said magazine comprising a magazine tension roller and a take-up and release roller having parallel axes, an endless tape having an external loop and an internal loop, said external loop passing around said take-up and release roller and extending out of an open end of the magazine, said internal loop pasing around said take-up and release roller and said magazine tension roller, said tape recorder comprising a recording head having a recording face disposed on a plane, said external loop having a plane of entrance and a plane of egress from said tape magazine substantially parallel with said plane of said recording face, wherein said recorder is operable to drive said endless tape, said internal loop being twisted and comprising a plurality of tape loops, said tape loops being wound individually wherein each succeeding loop is disposed to lie over each preceding loop, a twist guide embracing said internal loops, said twist guide comprising a plurality of members forming a centrally located opening, said opening having an annular configuration to support said internal loops.

19. A combination in accordance with claim 18 wherein said magazine comprises a bin disposed adjacent an end of said magazine, said bin comprising an upstream opening and a downstream outlet and a portion of said external loop passing therethrough, a brake disposed at said downstream outlet operable to produce a drag on said external loop when said loop is motivated by said recorder, said brake maintaining the tape taut as it passes from the outlet of the bin to the take-up and release roller, said bin serving to house tape in a slack tension condition.

20. A tape magazine comprising, a magazine tension roller and a take-up and release roller having parallel axes spaced from each other, an endless tape having a substantially uniform width defining a centerline therewithin, said tape having an internal loop and an external loop extending therefrom, said internal loop having a twist to form at least one figure 8, said external loop overlaying said tension roller and extending outside of the magazine, and a plane perpendicular to said roller axes that is common to said internal and external loop centerline throughout the entire extent thereof.

References Cited

UNITED STATES PATENTS

| | | | |
|---|---|---|---|
| 1,459,795 | 6/1923 | Pavely | 242—55.01 |
| 2,044,267 | 6/1936 | Wiggins | 242—55.01 |
| 3,088,687 | 5/1963 | Martin | 242—55.19 |
| 3,106,355 | 10/1963 | Warren | 242—55.01 |
| 3,126,162 | 3/1964 | MacKenzie | 179—100.2 |
| 3,155,335 | 11/1964 | Maeder | 179—100.2 |

BERNARD KONICK, *Primary Examiner.*

L. J. SCHROEDER, *Assistant Examiner.*